United States Patent [19]

Chiu

[11] Patent Number: 5,669,618

[45] Date of Patent: Sep. 23, 1997

[54] BICYCLE TRAILER

[76] Inventor: Ping-Jan Chiu, No. 1146, Chung-Shan Rd., Ta-Chia Chen, Taichung Hsien, Taiwan

[21] Appl. No.: 548,061

[22] Filed: Oct. 25, 1995

[51] Int. Cl.$^6$ ................................................. B62K 27/12
[52] U.S. Cl. ........................... 280/204; 280/292; 280/495; 280/656
[58] Field of Search ................................. 280/202, 204, 280/292, 400, 483, 495, 503, 639, 644, 645, 646, 647, 656, 42, 650, 40, 504

[56] References Cited

U.S. PATENT DOCUMENTS

| | | | |
|---|---|---|---|
| 4,168,093 | 9/1979 | Dysthe et al. | 280/400 X |
| 4,721,320 | 1/1988 | Creps et al. | 280/504 X |
| 5,200,919 | 4/1993 | Newbold | 280/202 |
| 5,242,178 | 9/1993 | Galasso et al. | 280/203 |
| 5,454,577 | 10/1995 | Bell | 280/204 |

FOREIGN PATENT DOCUMENTS

| | | | |
|---|---|---|---|
| 0 589 480 | 3/1994 | European Pat. Off. | 280/204 |
| 435068 | 5/1948 | Italy | 280/639 |

*Primary Examiner*—Victor E. Johnson
*Attorney, Agent, or Firm*—Lowe, Price, LeBlanc & Becker

[57] ABSTRACT

A bicycle trailer includes a carrier frame, two wheels provided on two sides of the carrier frame, and a connecting device which is adapted to couple with a frame body of the bicycle. The carrier frame has two pairs of vertical stubs extending upward therefrom in such a manner that one pair of stubs are respectively located on two sides of the front end portion while the other pair of stubs are respectively located on two sides of the rear end portion, and a seat secured to a lower surface of the front end portion of the carrier frame. The connecting device includes a connecting rod pivoted to the seat and rotatable about a horizontal axis, and a coupler unit attached on a front end section of the connecting rod. The coupler unit includes a vertical inner plate adapted to be disposed on one side of the frame body and abutting against a seat stay and a chain stay of the frame body, and a vertical outer plate disposed on the other side of the frame body and abutting against the seat stay and the chain stay. The outer plate is fastened threadedly to the inner plate to lock the coupler unit on the bicycle frame body.

3 Claims, 7 Drawing Sheets

15,669,618

BICYCLE TRAILER

BACKGROUND OF THE INVENTION

1. Field of the Invention

The invention relates to a bicycle, more particularly to a bicycle trailer which has a connecting device adapted to be fastened on the frame body of a bicycle so as to be towed by the bicycle and which can be detached easily from the bicycle for storage.

2. Description of the Related Art

A conventional bicycle trailer includes an annular carrier frame, two wheels provided on two side portions of the frame, and a connecting rod which integrally extends from the frame. In use, a rope fastens the connecting rod on a bicycle so that the conventional bicycle trailer can be towed by the bicycle.

Some of the drawbacks resulting from the use of the aforesaid trailer are as follows:

(I) During the tow, the fastening rope may break off, thereby possibly resulting in overturning of the trailer.

(II) The conventional bicycle trailer is too bulky in size to be detached easily for storage.

(III) There is no other means to damp vibration of the trailer during tow.

SUMMARY OF THE INVENTION

The object of this invention is to provide a bicycle trailer which can overcome the abovementioned drawbacks that are generally associated with the conventional bicycle trailer.

According to this invention, the bicycle trailer includes an annular carrier frame, two wheels provided on two side portions of the frame, and a connecting device which is coupled with the frame body of a bicycle. The carrier frame has a front end portion, a rear end portion, two pairs of vertical stubs extending upward therefrom in such a manner that one pair of stubs are respectively located on two sides of the front end portion while the other pair of stubs are respectively located on two sides of the rear end portion, and a pivot seat secured to a lower surface of the front end portion of the frame. The connecting device includes a connecting rod with a rear end section pivoted to the pivot seat in such a manner that the connecting rod can rotate about a horizontal axis, and a coupler unit attached on a front end section of the connecting rod. The coupler unit includes an elongated vertical inner plate disposed on one side of the frame body and abutting against a seat stay and a chain stay of the frame body, and an elongated vertical outer plate disposed on the other side of the frame body and abutting against the seat stay and the chain stay. The outer plate is fastened threadedly to the inner plate and has an inclined upper fastening tab and a lower fastening tab which extend toward the inner plate, and a positioning stub which project rearward from a lower end portion of the outer plate to abut against a kickstand-mounting piece which is secured on the chain stay near the rear wheel axle of the frame body. Thus, the coupler unit is locked on the seat stay and the chain stay of the frame body.

BRIEF DESCRIPTION OF THE DRAWINGS

Other features and advantages of this invention will become more apparent in the following detailed description of the preferred embodiment with reference to the accompanying drawings, in which.

DETAILED DESCRIPTION OF THE PREFERRED EMBODIMENT

Figure 1:
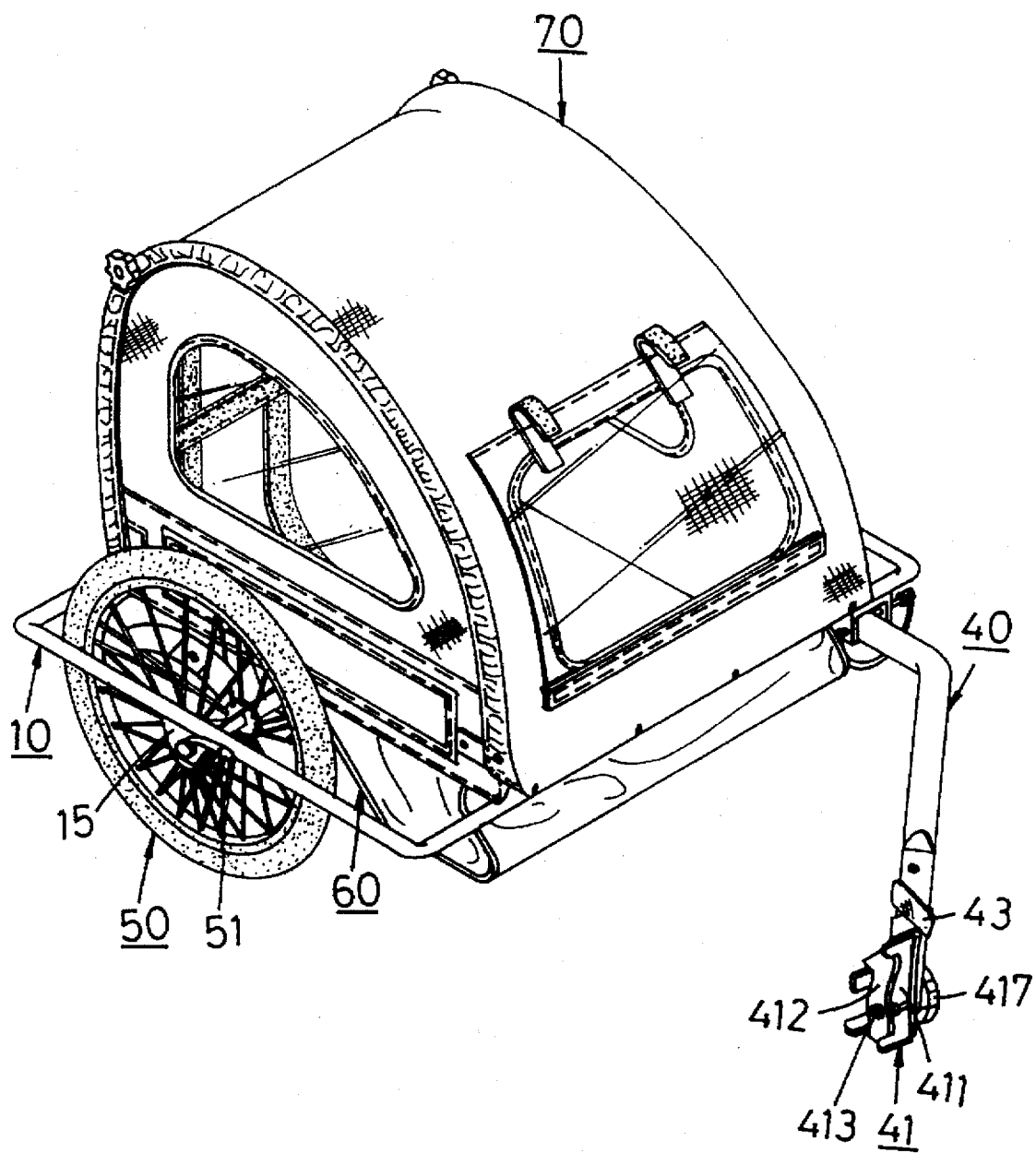
FIG. 1 is a perspective view of a bicycle trailer of this invention.
Figure 2:
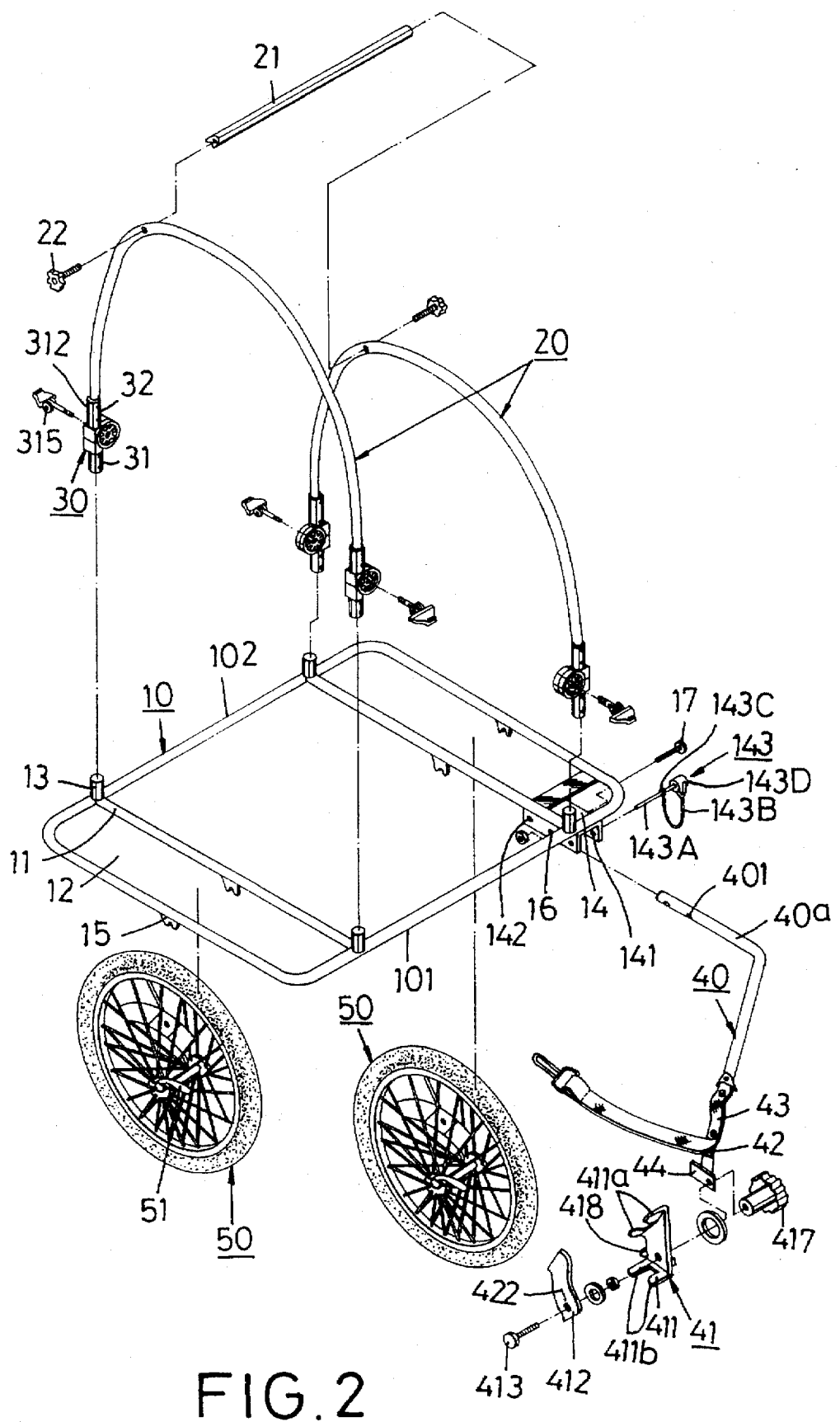
FIG. 2 is an exploded view of the bicycle trailer shown in FIG. 1, in which the covering sheet is removed therefrom.

Referring to FIGS. 1 and 2, a bicycle trailer of this invention includes an annular carrier frame 10, a pair of curved support rods 20, four quick-release locking units 30, a connecting device 40, two wheels 50, and a covering sheet 70.

The frame 10 has a front end portion 101, a rear end portion 102, two fixed horizontal mounting rods 11 located between the front and rear end portions 101, 102 so as to define two wheel-receiving spaces 12 in two side portions of the frame 10, two pairs of vertical stubs 13 extending upward from the frame 10 in such a manner that one pair of the stubs 13 are respectively located on two sides of the front end portion 101 while the other pair of the stubs 13 are respectively located on two sides of the rear end portion 102, and a pivot seat 14 secured to a lower surface of the front end portion 101 of the frame 10 adjacent to one side portion thereof. A seat 60 is fixed on the frame 10 between the rods 11.

The wheels 50 are respectively disposed in the wheel-receiving spaces 12 of the frame 10. Each of the wheels 50 has an axle 51 journalled between two adjacent mounting seats 15 of the frame 10.

Figure 3:
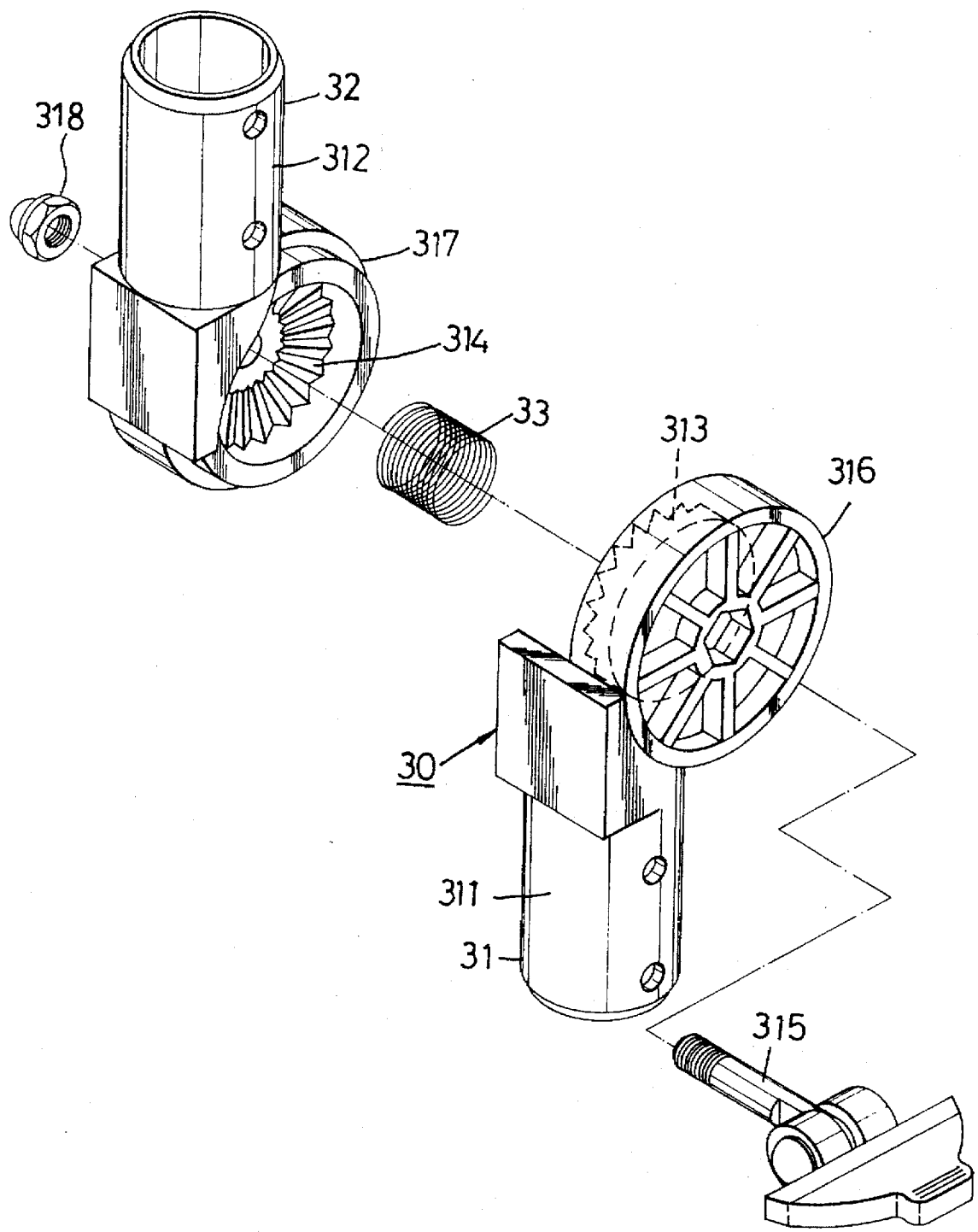
FIG. 3 is an exploded view of a quick-release locking unit employed in the bicycle trailer of this invention.

Referring to FIG. 3, each of the quick-release locking units 30 includes a lower half 31 which has a lower tubular section 311 sleeved securely on the corresponding stub 13 (see FIG. 2) and an upper annular ring 316 with internal teeth 313, an upper half 32 which has a lower annular ring 317 provided with internal teeth 314 that mesh with the teeth 313 of the lower half 31, a compression spring 33 interposed between the rings 316, 317 of the halves 31, 32, and a lock bolt 315 extending through the rings 311, 312 to engage a nut 318 so as to lock the upper half 32 on the lower half 31.

Figure 4:
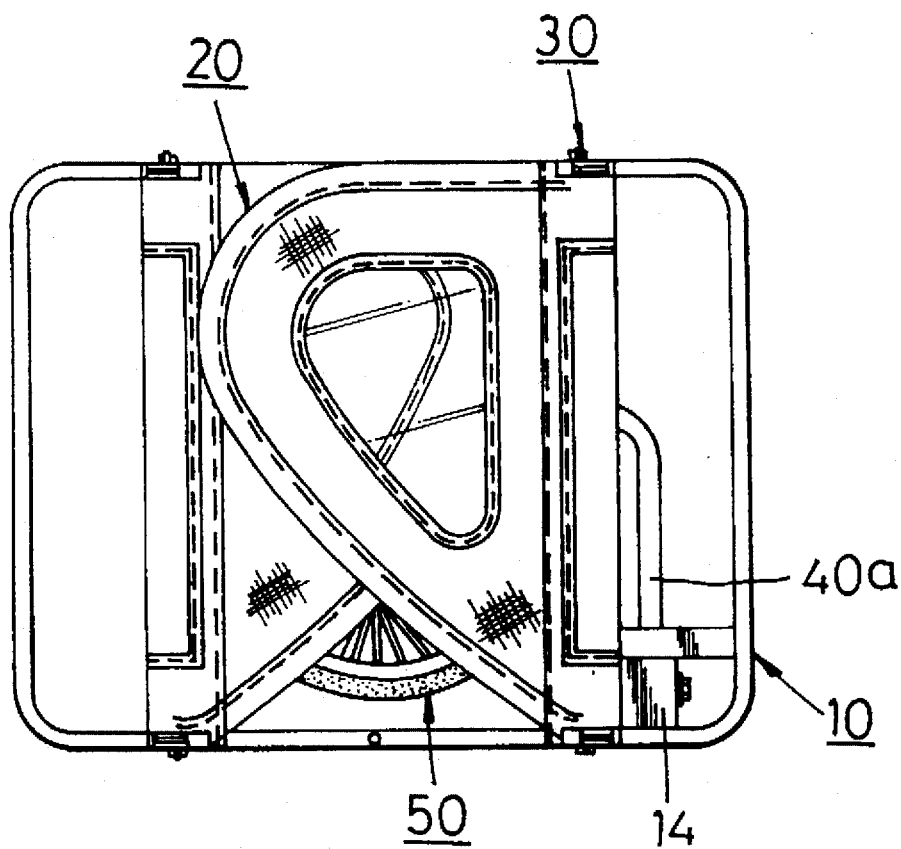
FIG. 4 illustrates how the covering sheet and a connecting rod of the bicycle trailer of this invention are folded for storage.

As illustrated in FIGS. 2 and 4, the end portions of the support rods 20 are inserted into the upper tubular sections 312 of the upper halves 32 of the locking units 30. When desired, the upper halves 32 can be unlocked from the lower halves 31 by loosening the nuts 318 (see FIG. 3) so as to rotate the upper halves 32 on the frame 10, thus laying the support rods 20 on the frame 10. A reinforcing rod 21 (see FIG. 2) is detachably connected to the support rods 20 by screws 22 before the sheet 70 (see FIG. 1) is stretched over the support rods 20.

Figure 4A:
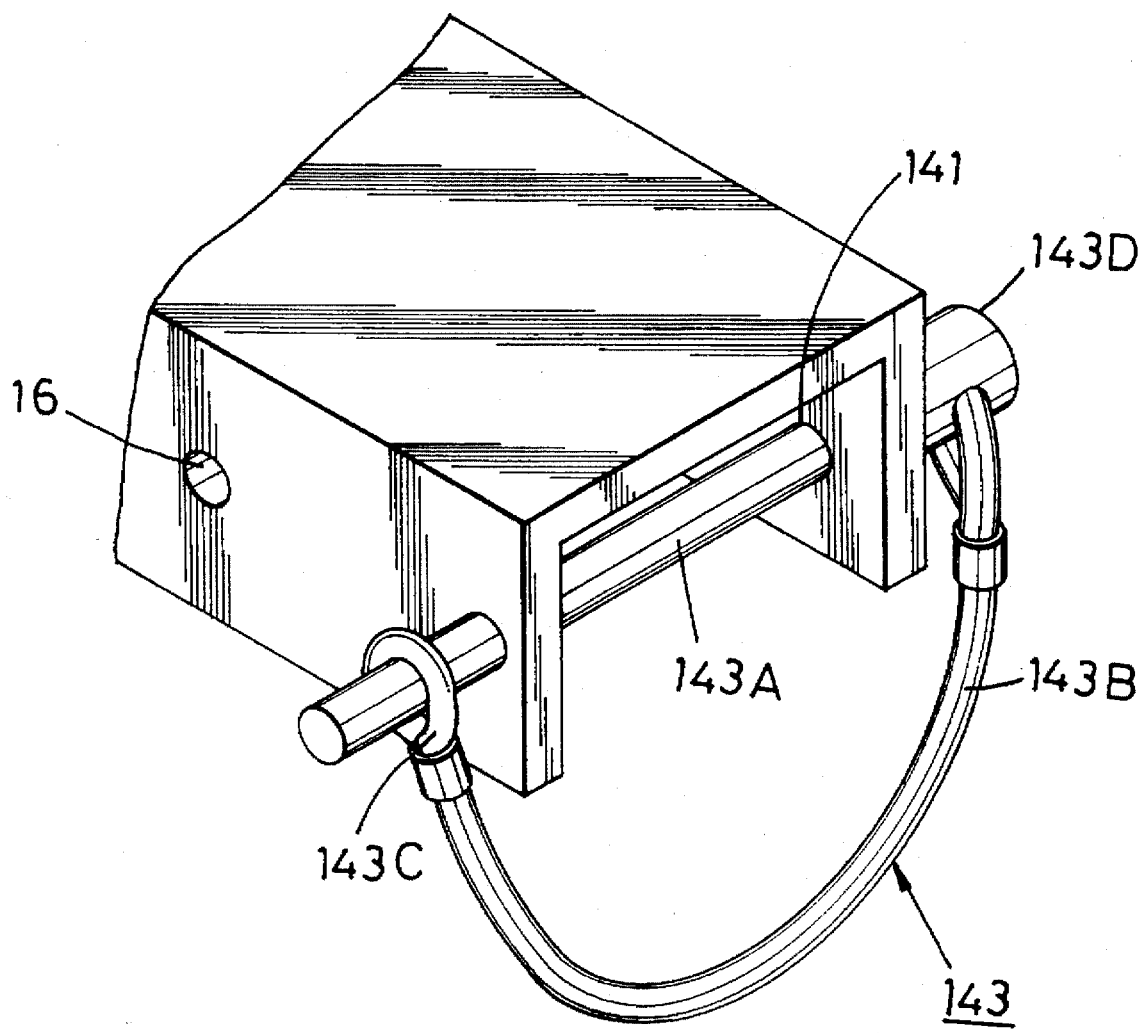
FIG. 4A illustrates the position of a lock pin on the pivot seat of the bicycle trailer of this invention.

Referring again to FIGS. 2, 5 and 6, the connecting device 40 includes a generally L-shaped connecting rod 40a, a coupler unit 41 attached on a front end section of the connecting rod 40a, and a pivot pin 17 extending through a rear end section of the connecting rod 40a and the pivot hole 16 of the seat 14 in such a manner that the connecting rod 40a can be rotated about the pin 17 between a storage position and a used position. A lock pin 143 extends through the holes 141 of the seat 14 and the hole 401 of the connecting rod 40a, so as to prevent rotation of the connecting rod 40a on the seat 14, in such a manner that the position of the lock pin 143 relative to the pivot seat 14 is that shown in FIG. 4A. As illustrated, the lock pin 143 includes a pin body 143A and a U-shaped metal wire 143B which has an outer end fastened to an enlarged outer end 143D of the pin body 143A, and an inner end fastened to a retaining ring 143C sleeved slidably on the inner end portion of the pin body 143A outside the seat 14. The ring 143C can be removed forcibly from the pin body 143A. In a case where no external force is applied to the lock pin 143, the shape of the wire 143B shown in FIG. 4A can be maintained in such a manner that the ends of the wire 143B are spaced apart at a distance smaller than the total length of the pin body 143A so as to prevent removal of the lock pin 143 from the seat 14. By removing the ring 143C from the pin body 143A, the connecting rod 40a can be folded to the storage position shown in FIG. 4, wherein the pin body 143A extends through the holes 401 of the connecting rod 40a and the holes 142 of the pivot seat 14, and wherein the ring 143C is again sleeved onto the pin body 143A. In this case, the connecting rod 40a abuts against the lower surface of the frame 10.

Figure 5:
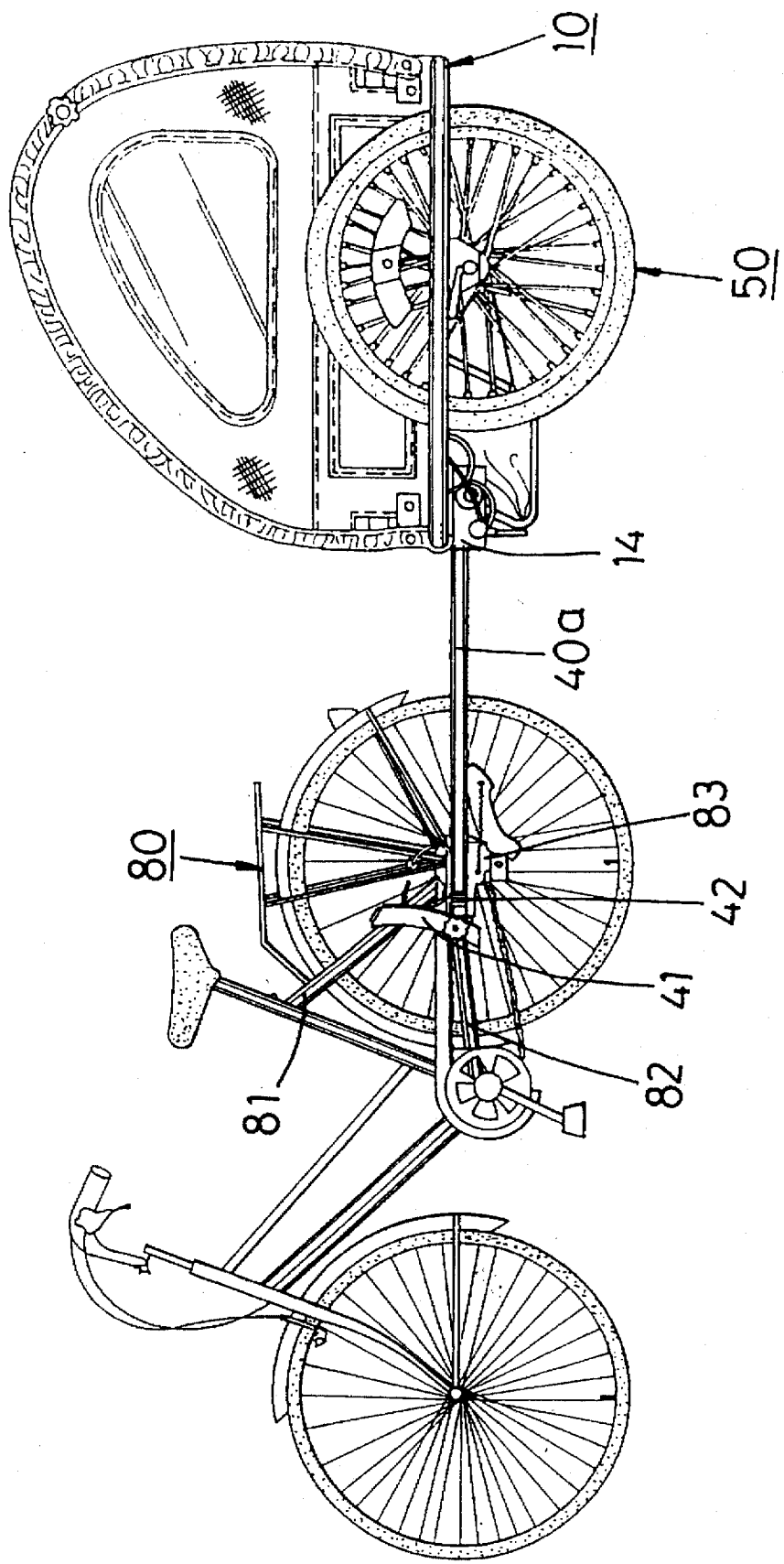
FIG. 5 illustrates how the bicycle trailer of this invention is attached to a bicycle.
Figure 6:
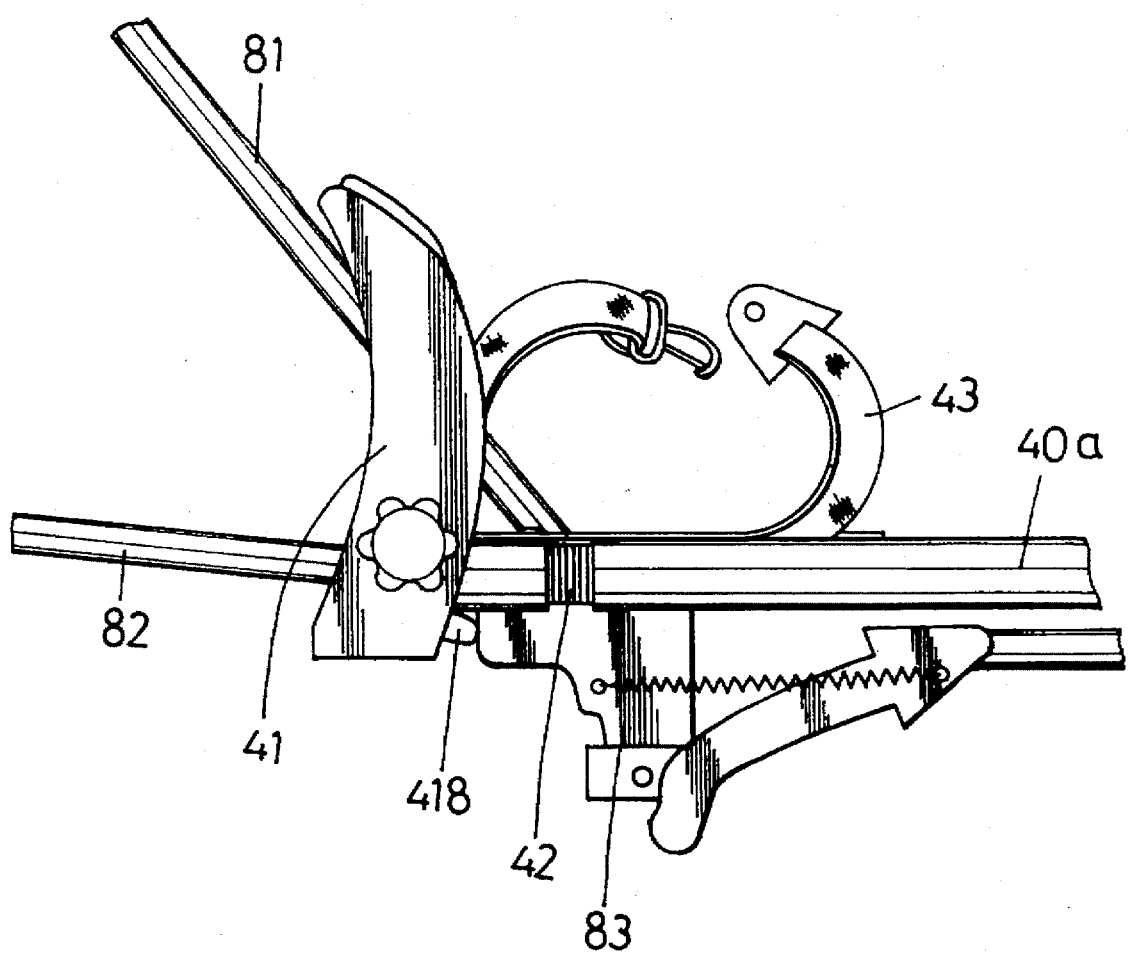
FIG. 6 illustrates how a coupler unit of the bicycle trailer of this invention is mounted on the bicycle.

As best illustrated in FIG. 2 and 5, the free end portion of the connecting rod 40a is equipped with a mounting plate 44, a reinforcing strap 43 fastened to the connecting rod 40a, and a compression spring 42 interconnecting the mounting plate 44 and the connecting rod 40a. The coupler unit 41 includes an elongated vertical inner plate 412 disposed on one side of the frame body 80 and abutting against a seat stay 81 and a chain stay 82 of the frame body 80, an elongated vertical outer plate 411 disposed on the other side of the frame body 80 and abutting against the seat stay 81 and the chain stay 82 in such a manner that inclined upper and lower fastening tabs 411a, 411b on the outer plate 411 extend toward the inner plate 412, and a positioning stub 418 which projects rearward from a lower end portion of the outer plate 411 to abut against a kickstand-mounting piece 83 which is secured on the chain stay 82 near a rear wheel axle of the frame body 80. A locking bolt 413 is inserted through the hole 422 of the inner plate 412 and through the mounting holes of the outer plate 411 and the mounting plate 44. A nut 417 is threaded on the bolt 413 so as to lock the plates 411, 412 on the stays 81, 82 so as to prevent disengagement of the coupler unit 41 from the frame body 80.

The spring 42 can damp vibrations of the frame 10 and assists in steering the bicycle 80. The strap 43 is generally fastened to the bicycle 80.

As above explained, the wheels 50 and the rods 20, 40a can be folded relative to the frame 10 so as to minimize the storage space.

With this invention thus explained, it is obvious to those skilled in the art that various modifications and variations can be made without departing from the scope and spirit thereof. It is therefore intended that the invention be limited only as in the appended claims.

I claim:

1. A bicycle trailer for towing by a bicycle which includes a frame body having a seat stay, a chain stay, a rear wheel axle, and a kickstand-mounting piece installed on the frame body adjacent to the rear wheel axle, said bicycle trailer comprising:
   a) an annular carrier frame,
   b) two wheels provided on two side portions of the carrier frame, and
   c) a connecting device which is adapted to be coupled with the frame body of the bicycle,
   d) wherein the carrier frame has a front end portion, a rear end portion, two pairs of vertical stubs extending upward therefrom in such a manner that one pair of the stubs are respectively located on two sides of the front end portion while the other pair of the stubs are respectively located on two sides of the rear end portion, and a pivot seat secured to a lower surface of the front portion of the carrier frame; and
   e) the connecting device includes a connecting rod having a rear end section pivoted to the pivot seat in such a manner that the connecting rod can rotate about a horizontal axis, a front end section, and a coupler unit attached on the front end section, the coupler unit including a vertical inner plate adapted to be disposed on one side of the frame body so as to abut against the seat stay and the chain stay of the frame body, and a vertical outer plate adapted to be disposed on a side of the frame body opposite said one side so as to abut against the seat stay and the chain stay, said outer plate being fastened threadedly to the inner plate in such a manner that the outer plate has an inclined upper fastening tab extending toward the inner plate and adapted to abut against the seat stay, a lower fastening tab extending toward the inner plate and adapted to abut against the chain stay, and a positioning stub projecting rearward from a lower end portion of the outer plate and adapted to abut against the kickstand-mounting piece, wherein the inner and outer plates are lockable on the seat stay and the chain stay as to prevent disengagement of the coupler unit from the frame body.

2. The bicycle trailer as defined in claim 1, wherein four quick-release locking units are mounted respectively to the stubs of the carrier frame, each of the locking units including a lower half secured on a corresponding one on the stubs, a vertical upper half disposed on the lower half, a nut, and a lock bolt extending through the halves to engage said nut so as to lock the upper half on the lower half in such a manner that the upper half can rotate on the lower half to lie on an upper surface of the carrier frame when the upper half is unlocked from the lower half.

3. The bicycle trailer as defined in claim 1, further comprising:
   a compression spring provided between the coupler unit and the front end section of the connecting rod to damp vibrations of the carrier frame; and
   a reinforcing strap attached to the front end section of the connecting rod and adapted to be fastened to the bicycle.

* * * * *